United States Patent
Argiros

[11] Patent Number: 6,086,969
[45] Date of Patent: Jul. 11, 2000

[54] CYLINDRICAL ROTATING BODY OF LOW INERTIA

[75] Inventor: James Michael Argiros, Dover, N.H.

[73] Assignees: Heidelberg Harris, Inc., N.H.; Heidelberger Druckmaschinen AG, Heidelberg, Germany

[21] Appl. No.: 08/831,455

[22] Filed: Mar. 31, 1997

Related U.S. Application Data

[63] Continuation of application No. 08/462,496, Jun. 5, 1995, abandoned.

[51] Int. Cl.[7] .............................. B29D 22/00; A47G 19/22
[52] U.S. Cl. ....................... 428/36.1; 428/34.5; 428/35.4; 428/35.7; 428/35.8; 428/36.6; 428/36.9; 442/43
[58] Field of Search ................... 428/34.5, 36.1, 428/35.4, 35.7, 35.8, 36.6, 36.9; 442/43

[56] References Cited

U.S. PATENT DOCUMENTS

| | | |
|---|---|---|
| 3,654,050 | 4/1972 | Fraser ......................... 428/12 |
| 4,062,098 | 12/1977 | Brugman ...................... 226/191 |
| 4,583,460 | 4/1986 | Maslin et al. ................ 101/375 |
| 4,903,597 | 2/1990 | Hoage et al. . | 
| 5,133,125 | 7/1992 | Diebels et al. ................ 29/527.2 |
| 5,324,246 | 6/1994 | Quigley ........................ 492/50 |
| 5,402,721 | 4/1995 | Schultz ...................... 101/389.1 |
| 5,468,568 | 11/1995 | Kuhn et al. ................... 428/245 |
| 5,686,155 | 11/1997 | Suzue et al. .................. 428/34.5 |

FOREIGN PATENT DOCUMENTS

| | | |
|---|---|---|
| 0 451 890 A1 | 10/1991 | European Pat. Off. . |
| 124788 | 3/1977 | Germany . |
| 93 14 568 U | 2/1995 | Germany . |
| 2073850 | 10/1981 | United Kingdom . |

*Primary Examiner*—Terrel Morris
*Assistant Examiner*—Ula C. Ruddock
*Attorney, Agent, or Firm*—Kenyon & Kenyon

[57] ABSTRACT

A cylindrical rotating body (1) of low inertia is provided including a cylindrical body (1) having a large length/diameter ratio. The cylindrical body (1) is of thin wall thickness and is sealed at the opposite ends by sealing means (3, 8). The hollow interior (9) of the cylindrical body (1) is loaded with a pressurized medium (10).

13 Claims, 3 Drawing Sheets

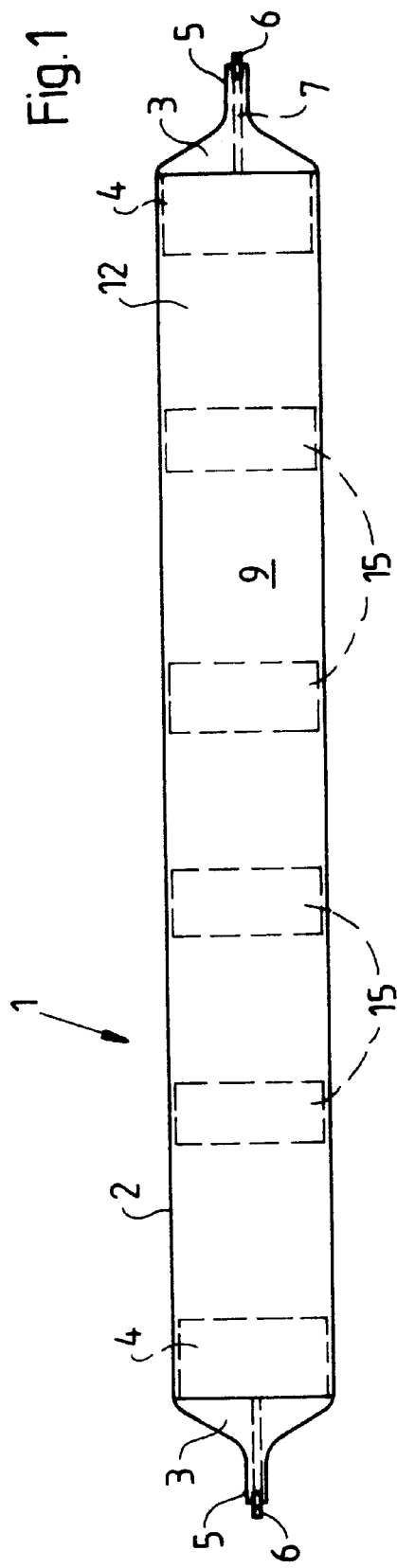
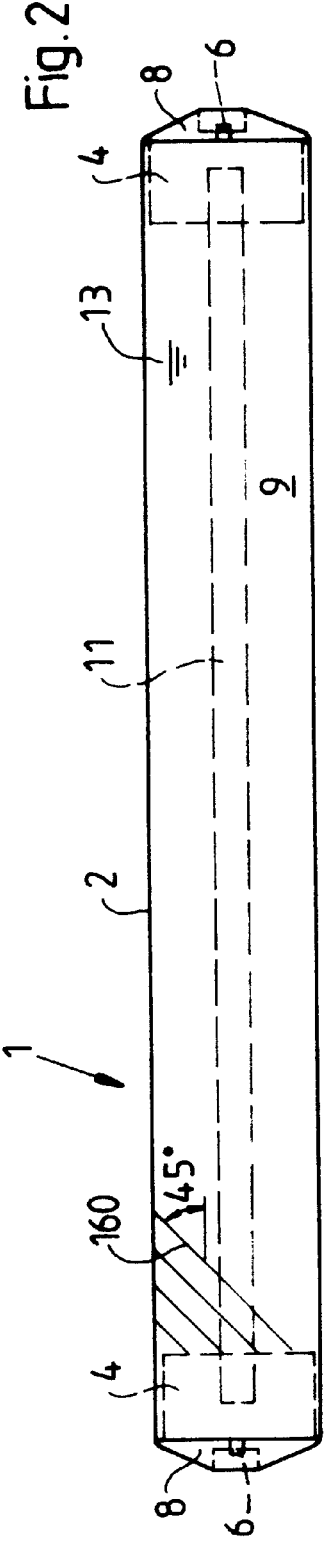

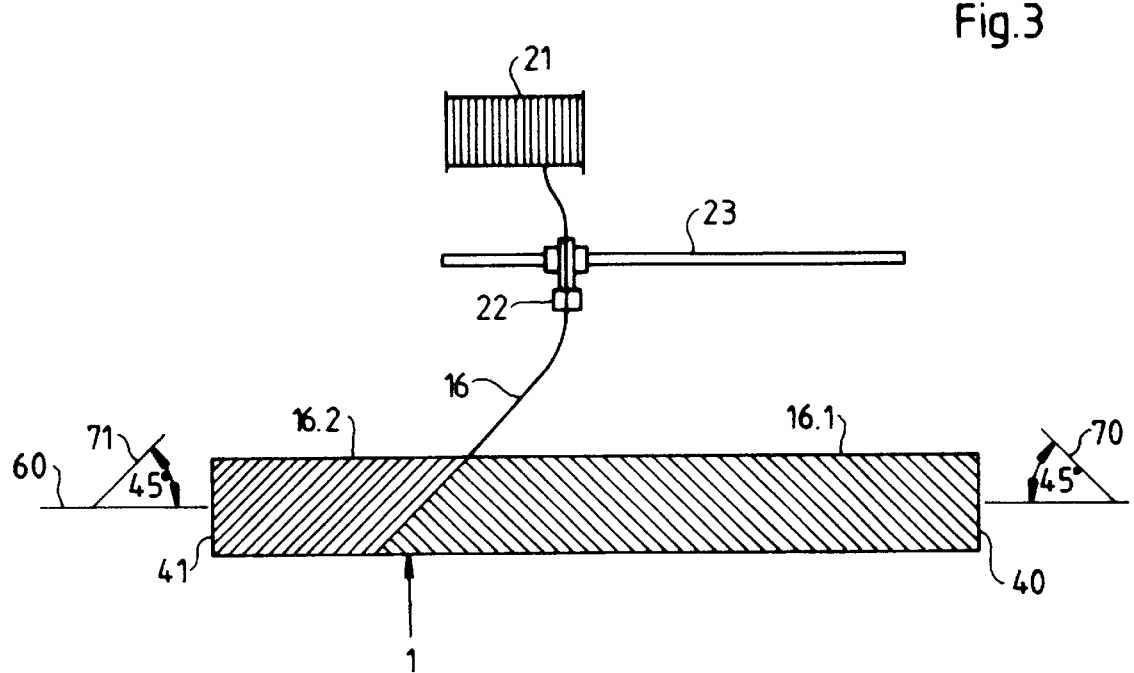

CYLINDRICAL ROTATING BODY OF LOW INERTIA

This application is a continuation of application Ser. No. 08/462,496, filed on Jun. 5, 1995, now abandoned.

FIELD OF THE INVENTION

The present invention relates to a cylindrical rotating body of low inertia, particularly for use within a rotary printing press.

BACKGROUND OF THE INVENTION

U.S. Pat. No. 4,903,597 purports to disclose printing sleeves and methods for mounting and dismounting therefore. A unitary, cylindrically-shaped printing sleeve is provided which is readily axially mountable on and dismountable from a complementary cylindrically-shaped printing cylinder. The printing cylinder is hollow and its interior is used as a compressed air chamber. The cylinder has a cylindrical tube with air tight end plates. A plurality of spaced-apart, radially extending apertures are provided in the tube through which air from the chamber may pass for expanding the sleeve during mounting and dismounting operations.

EP 0 451 890 A1 purports to disclose a roller and a method for the manufacture of the roller. A cylindrical metal roller casing is centered relative to roller shaft means. This casing, a thin electrolytically formed sleeve is centered by journals and a low density filling is applied to the casing. The low density filling provides rigidity to the roller casing, i.e. the electrolytically formed sleeve.

SUMMARY OF THE INVENTION

In accordance with the present invention, a cylindrical rotating body of low inertia includes a cylindrical body having a large length/diameter ratio, the cylindrical body being made of a composite material with thin wall thickness. The hollow interior of the cylindrical body is sealed by end caps and loaded with a pressurized medium.

The cylindrical body and the end caps may be made of a composite material of a layered structure. The end caps may alternatively be made of metal, such as aluminum. The cylindrical body and the end caps comprise reinforcing elements. For example, the end caps may have ring-shaped elements to be inserted in the hollow interior of the cylindrical body. Another reinforcing arrangement is a pretensioning or precompressioning rod bridging the hollow interior of the cylinder body to improve bending stiffness. The pretensioning or precompressioning rod preferably extends through a centerline of the cylinder body. Ring-shaped elements spaced over the width of the cylindrical body may also be utilized to improve bending stiffness.

The cylinder surface of the cylinder body may have a groove pattern angularly offset from the cylinder body's centerline. The groove pattern allows for removal of an air-bearing or air film between the material web and the roller surface. The composite material may be formed with strands of fibre glass or other material with an angular orientation of 45° relative to the center line, starting from each cylinder end. It is also possible to reinforce the composite material with pretensioned longitudinal strands or fibers to increase the bending stiffness of the cylinder body.

The composite material can be a layered material or fibre glass, for example. Furthermore, it is conceivable to include a carbon-filled layer within a layered structure of the composite material. For example, the layered composite material may include strands, filaments, cords, cloth, mesh, wires, cylinders, or resins.

As an illustration, the composite materials could be fiber glass strands laminated between resin layers. The resin could be made of epoxy or polyester, for example. The strands could also be made of carbon fibre and/or graphite rather than glass.

Alternatively, the composite material could be made of wound cords imbedded in resin. The cords could be made of fibre glass, carbon fibre, and/or graphite.

The composite material could also be made of a metal cylinder laminated between resin layers.

The hollow interior of the cylinder body can be pressurized with gas, foam, liquid or a liquid mixture. Examples of acceptable gases include air, carbon dioxide, helium, or any other non-combustible gas. Examples of acceptable foams including expanding foams and structural foams. Examples of acceptable liquids include water, oils, coolants, etc; and examples of acceptable liquid mixtures include water/glycol, water/oil, and oil/oil mixtures.

The cylindrical rotating body according to the present invention may be manufactured by winding a first strand of a fibre material around a cylinder body from a first end of the cylinder body with an angular orientation of approximately 45 degrees relative to a centerline of the cylinder body; winding a second strand of a fibre material around a cylinder body from a second end of the cylinder body with an angular orientation of approximately 45 degrees relative to a centerline of the cylinder body to create a criss-cross pattern with the first strand; mounting an end cap on each end of the cylinder body to seal a hollow interior of the cylindrical body; and loading a pressurized medium into the hollow interior of the cylindrical body.

BRIEF DESCRIPTION OF THE DRAWINGS

FIG. 1 shows a cylindrical body of low inertial according to the present invention having end caps with journals.

FIG. 2 shows a cylindrical body of low inertial according to the present invention having end caps with hubs.

FIG. 3 illustrates the manner in which a cylindrical rotating body of low inertia according to the present invention may be manufactured.

DETAILED DESCRIPTION OF THE INVENTION

Figure 4A:
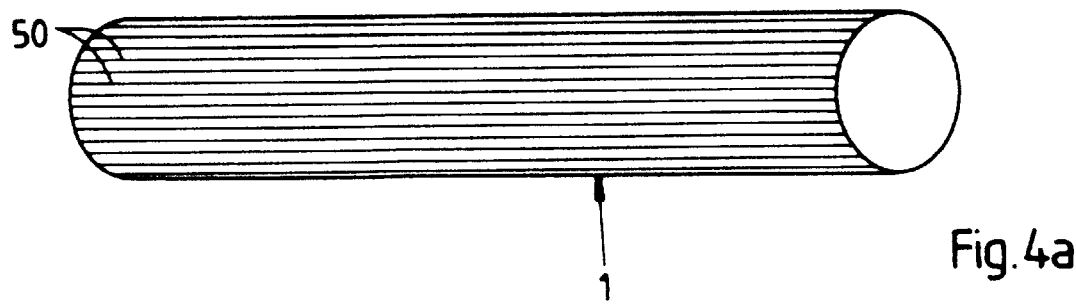
FIG. 4 shows the manner in which longitudinally extending strands may be incorporated into the cylindrical rotating body of low inertia according to the present invention.

FIG. 1 shows a cylindrical rotating body according to the present invention including a thin-walled cylinder having end caps with journals.

In accordance with this embodiment of the present invention, a cylinder body 1 has a cylinder surface 2. On the opposite ends of the cylinder body 1 end caps 3 are located. The end caps 3 have journals 5 and respectively include medium passages 7 connecting the hollow interior 9 of the cylinder body 1 with a medium source (not shown). A medium 10 can, for example, be a gas to be compressed within the hollow interior 9 of the cylinder body 1 or a foam. A liquid or liquid mixture may also be conducted through the passages 7 and into the hollow interior 9.

Examples of acceptable gases include air, carbon dioxide, helium, or any other non-combustible gas. Examples of acceptable foams include expanding foams and structural foams. Examples of acceptable liquids include water, oils, coolants, etc; and examples of acceptable liquid mixtures include water/glycol, water/oil, and oil/oil mixtures.

The end caps 3 each include reinforcement members 4. The reinforcement members 4 are constructed in a ring-shaped configuration in order to stiffen the outer ends of the cylinder body 1. As one of ordinary skill in the art will appreciate, filling the hollow interior 9 with a pressurized medium 10 improves the bending stiffness of the cylinder body 1 considerably. The pressure applied to the cylinder body 1 prestresses the cylinder body 1 which helps resist bending loads and prevent buckling and collapse of the thin walls of the cylinder body 1. Preferably, the ratio between the radius of the cylinder body 1 and the walls of the cylinder body 1 should be greater than or equal to 10:1.

The use of a filling in the hollow interior 9 to prestress the cylinder surface 2 of the cylinder body 1 reduces the cylinder body's inertia by reducing its mass while, at the same time, maintaining a sufficient stiffness. The mass reduction of the cylinder body 1 also significantly reduces manufacturing costs.

In accordance with a further embodiment of the present invention, the cylinder body 1 is made of a composite material. As a result, a failure of the rotating cylinder body 1 will only cause a crack in the cylinder surface 2. In contrast, failure of a pressurized metal cylinder body may result in metal particles breaking off and being projected into the work area. Consequently, injury to operators and damage to machine parts within a printing unit are prevented by utilizing a composite material.

The rotating cylinder body according to the present invention may be used in printing presses. For example, it can be used in a splicing unit or in an infeed having a festoon. It may also be used within chill rolls stands, an angle bar arrangement, in a folder or in a shifting and cutting unit.

As an example, the rotating cylinder body 1 according to the present invention can be used as adjustable cut-off cutting cylinders in folders or for tension-varying purposes. In addition, if a liquid or a liquid mixture, such as water, water/glycol, water/alcohol, oils, or coolants, is applied to the hollow interior 9 of the cylinder body 1, the present invention can be used in a chill roll assembly.

Referring to FIG. 1, the end caps 3 have ring shaped reinforcements 4 which are inserted into the hollow interior 9 of the cylinder body 1 at opposite ends thereof. In addition, ring shaped stiffening members 15 can be provided in the hollow interior 9 across the width of the cylinder body 1. These stiffening members 15 improve the rigidity of the structure considerably and are spaced from each other across the length of the cylinder body 1. The same effect—to improve bending stiffness of the cylinder body—can be reached by filling the hollow interior 9 of the cylinder body 1 with a foam. The passages 7 for the medium 10 may be provided with a fill valve or an end plug to seal the hollow interior 9 of the cylinder body off from the outer environment.

FIG. 2 shows a further embodiment of the present invention in which the end caps are provided with a hub. The air passages are provided in the same manner as in FIG. 1. The end caps 8 have the same reinforcement members 4 as those described in FIG. 1. They are provided with a sealing device 6, which may, for example, be a fill valve or an end plug.

Reference numeral 13 indicates a liquid applied to the hollow interior 9 of the cylindrical body 1 in the second embodiment. Additionally, the cylindrical surface 2 of the cylindrical body 1 is provided with an outer groove pattern 160. The groove pattern 160 may be applied to the cylinder body circumference with an angular orientation of 45° relative to the center line. By means of this groove pattern 160, air bearings or air films between a material web and the surface of a roller are eliminated.

In the embodiments according to FIGS. 1 and 2, a longitudinally extending pretensioning or precompressioning rod 11 may also be provided as illustrated in FIG. 2. Its connection to the end caps 8 is only schematically indicated.

However, it should be understood that the rod 11 can be connected to the end caps by threading the rod 11 to the end caps, by connecting the rod 11 to the end caps with pins, by bonding the rod 11 to the end caps, by welding the rod 11 to the end caps, or in any other suitable manner. If the rod 11 is treaded onto the end caps by end nuts threaded onto the rod, the rod ends will protrude through the air passage to the outside of the end caps.

The pretensioning or precompressioning rod 11 extends through the centerline of the cylinder body 1. It provides better bending stiffness of the cylindrical body 1. The pretensioning or precompressioning rod 11 can be made of any suitable material including, for example, steel.

Referring to FIG. 3, during manufacturing of the cylinder body, the stiffness of the cylinder body can be improved by winding the body with strands 16 of fibre glass or other fibre material in a criss-cross pattern with an angular orientation of 45° relative to the centerline 60. The winding will start from each end of the cylinder body to increase its bending strength. The winding of the strand is accomplished with conventional winding techniques.

As an example, a feed spool 21 holds a spool of wound strands 16. The strand 16 is fed through a guide 22 which is mounted on a guide bar 23. The cylindrical body 1 is rotatably mounted on a fixture (not shown). As the cylindrical body 1 is rotated about the cylinder centerline 60, the strand 16 is drawn out from the feed spool 21 through the guide 22, and is chemically bonded to the cylindrical body with, for example, resin. As the strand is wrapped around the rotating cylindrical body 1, the guide 22 is moved axially across the guide bar 23 at a rate which provides a 45 degree winding around the rotating cylindrical body 1. After a first layer of windings 16.1 is applied from the first end 40 of the cylindrical body 1 to form a 45 degree winding 70, the process is repeated beginning at the second end 41 to form a second layer of windings 16.2 having an opposite 45 degree winding 71.

Additionally, referring to FIG. 4(a), longitudinally extending strands 50 of fibre glass or other fibre material, i.e. carbon fibre, held in tension during the manufacturing process of the cylinder body, can be used to provide additional bending resistance to applied loads.

The application of the longitudinally extending strands 50 can be accomplished in any suitable manner. For example, the longitudinally extending strands 50 could be attached to rings at each end of the cylinder 1. Then during manufacturing, the rings could be pulled, holding the longitudinally extending strands 50 in tension during the manufacturing process.

Alternatively, each longitudinally extending strand 50 could be connected to winding drums or cylinders (similar to the manner in which guitar strings are mounted), and held in tension during the manufacturing process.

Figure 4B:
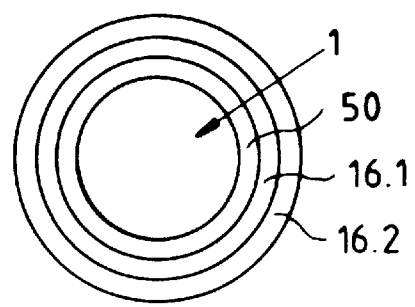
Figure 4C:
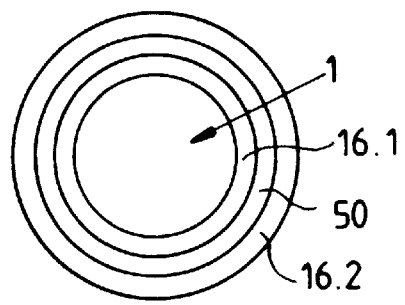
Figure 4D:
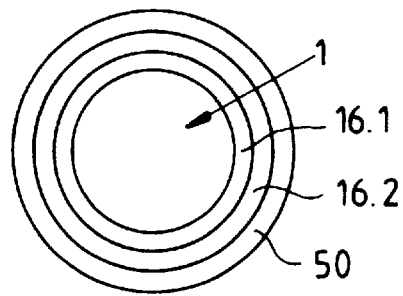

In accordance with the present invention, the longitudinally extending strands 50 can be applied below the winding layers 16.1, 16.2 as shown in FIG. 4(b), between two winding layers 16.1, 16.2 as shown in FIG. 4(*c*), or on top of the winding layers 16.1, 16.2 as shown in FIG. 4(*d*).

What is claimed is:

1. A cylindrical rotating body of low inertia comprising:
   - a hollow cylindrical body defining a web contacting outer surface, the hollow body consisting of a thin layer of a first composite material, wherein the composite material includes fibrous material embedded in a bonding resin, the fibrous material including pretensioned longitudinal fibers to increase a bending stiffness of the hollow cylindrical body;
   - a pair of end caps permanently mounted to the hollow body for sealing the hollow interior of the cylindrical body; and
   - a pressurized medium loaded within the cylindrical body.

2. The cylindrical rotating body according to claim 1, wherein said end caps comprise a second composite material.

3. The cylindrical rotating body according to claim 1, further comprising reinforcing elements disposed within the cylinder body.

4. The cylindrical rotating body according to claim 3, wherein the reinforcing elements are ring-shaped.

5. The cylindrical rotating body according to claim 3, wherein said reinforcing elements are a plurality of ring-shaped elements spaced apart from one another over a length of said cylindrical body.

6. The cylindrical rotating body according to claim 1, further comprising reinforcing elements disposed within the end caps.

7. The cylindrical rotating body according to claim 6, wherein the reinforcing elements are ring-shaped.

8. The cylindrical rotating body according to claim 1, wherein an outer surface of the cylindrical body has a groove pattern applied thereto.

9. The cylindrical rotating body according to claim 1, wherein said fibrous material is glass fiber.

10. The cylindrical rotating body according to claim 1, wherein said first composite material includes a carbon-filled layer.

11. The cylindrical rotating body according to claim 1, wherein said pressurized medium is a gas.

12. The cylindrical rotating body according to claim 1, wherein a thickness of a wall of the cylindrical body is no greater than one tenth of a radius of the cylindrical body.

13. A cylindrical rotating body of low inertia comprising:
   - a hollow cylindrical body defining a web contacting outer surface, the hollow body consisting of a thin layer of a first composite material, wherein the composite material includes a sheet of metal between two coatings of a bonding resin, a fibrous material including pretensioned longitudinal fibers to increase a bending stiffness of the hollow cylindrical body being embedded in the bonding resin;
   - a pair of end caps permanently mounted to the hollow body for sealing the hollow interior of the cylindrical body; and
   - a pressurized medium loaded within the cylindrical body.

* * * * *